US012650328B2

(12) United States Patent
Lundberg et al.

(10) Patent No.: US 12,650,328 B2
(45) Date of Patent: Jun. 9, 2026

(54) BEAD AND POWDER DISPENSING DEVICE

(71) Applicant: Max-Planck-Gesellschaft zur Förderung der Wissenschaften e.V., Munich (DE)

(72) Inventors: Derek Lundberg, Tübingen (DE); Ulrich Lutz, Tübingen (DE); Detlef Weigel, Tübingen (DE)

(73) Assignee: MAX-PLANCK-GESELLSCHAFT ZUR FORDERUNG DER WISSENSCHAFTEN E.V., Munich (DE)

( * ) Notice: Subject to any disclaimer, the term of this patent is extended or adjusted under 35 U.S.C. 154(b) by 315 days.

(21) Appl. No.: 18/294,651

(22) PCT Filed: Aug. 13, 2021

(86) PCT No.: PCT/EP2021/072625
§ 371 (c)(1),
(2) Date: Feb. 2, 2024

(87) PCT Pub. No.: WO2023/016659
PCT Pub. Date: Feb. 16, 2023

(65) Prior Publication Data
US 2024/0337519 A1 Oct. 10, 2024

(51) Int. Cl.
*G01F 19/00* (2006.01)
(52) U.S. Cl.
CPC ................................. *G01F 19/00* (2013.01)

(58) Field of Classification Search
None
See application file for complete search history.

(56) References Cited

U.S. PATENT DOCUMENTS

| | | | | |
|---|---|---|---|---|
| 2,730,285 A | * | 1/1956 | Angelo | .................... B65B 3/305 |
| | | | | 141/183 |
| 2,992,759 A | | 7/1961 | Warlick | |
| 6,382,461 B1 | | 5/2002 | Olsson | |
| 2003/0021734 A1 | * | 1/2003 | Vann | ....................... B01L 3/563 |
| | | | | 422/942 |

FOREIGN PATENT DOCUMENTS

| | | | | | |
|---|---|---|---|---|---|
| AU | 2016231662 A1 | * | 4/2017 | ................ | G01F 1/76 |
| CN | 107249749 B | * | 9/2020 | ............ | B02C 18/16 |
| EP | 2952470 A1 | | 12/2015 | | |
| EP | 3114975 A1 | * | 1/2017 | .............. | A47J 31/42 |
| EP | 4070045 B1 | * | 7/2024 | ........... | G01F 19/002 |
| GB | 918053 A | | 2/1963 | | |
| GB | 1046136 A | | 10/1966 | | |

OTHER PUBLICATIONS

International Search Report and Written Opinion in PCT/EP2021/072625 mailed May 11, 2022, 12 pages.

* cited by examiner

*Primary Examiner* — Stephanie E Bloss
*Assistant Examiner* — Diana Hancock
(74) *Attorney, Agent, or Firm* — Rothwell, Figg, Ernst & Manbeck, P.C.

(57) ABSTRACT

The present invention relates to a device for dispensing a measured amount of a particulate material and a method.

29 Claims, 4 Drawing Sheets

BEAD AND POWDER DISPENSING DEVICE

CROSS REFERENCE TO RELATED APPLICATION(S)

This application is a 35 U.S.C. § 371 National Stage of International Patent Application No. PCT/EP2021/072625, filed Aug. 13, 2021, designating the United States.

The present invention relates to a device for dispensing a measured amount of a particulate material and a method.

BACKGROUND

Many food products and laboratory materials are dry powders, particles, and small beads that are frequently needed in the same standardized quantity. For this purpose they are commonly dispensed with a device that can repeatedly produce the same measured unit. For example, milk and sports drink powders, wheat flour, and some laboratory powders are commonly measured using scoops sometimes referred to as "measuring cups". Small glass beads used for grinding biological samples in the laboratory in a procedure known as "bead beating" are sometimes dispensed with mechanical devices upon which the press of a button can drop a defined number of beads into a tube.

A plethora of devices exist to dispense such materials. However, apart from measuring cups, the vast majority use moving parts including, but not limited to, buttons, turnable dials, or slides. Devices with moving parts, however, are susceptible to grit or contamination impairing their function by causing friction between the moving parts. This problem is especially relevant when dispensing rough particles such as fine sand and can interfere with the operation. Devices with moving parts are also more difficult to clean or sterilize, often requiring disassembly and usually containing some parts that cannot be immersed in disinfectant or autoclaved. Many such devices are also not ideal for long-term storage of the substance, as they either are not connected to the storage container, or the moving parts make them more permeable to water vapor in air, which can spoil hygroscopic materials.

Those measuring cup-like existing devices that do not contain moving parts, e.g. plastic scoops with open tops, are well-suited for dispensing materials such as fine sand, but do not contain the substance to be measured. In addition, to avoid spills, they must be filled over a container that can trap the excess that overflows from the scooped amount. Furthermore, being hand-held, they expose the substance being dispensed to contamination such as foreign particles and microbes, a problem ameliorated but not solved by wearing gloves. The wide-mouthed storage containers used with scoops must be often opened, allowing contaminants to enter and risking potential spoilage of hygroscopic materials by water vapor. In the home for products like infant formulas, or in life science fields such as microbiology, cleanliness is especially important and leads to the best outcomes.

For some applications, it is possible to directly purchase pre-dispensed units that have been produced in a clean factory environment. For example, it is possible to buy laboratory tubes prefilled with a precise amount of a wide variety of dry substances. However, this convenience comes at an extra expense, and allows less flexibility of substances and amounts.

One example of a dispenser for glass balls is the Qiagen® TissueLyser Single-Bead dispenser, which superficially resembles a pen or pipette. It contains a reservoir for glass balls, and can be adjusted to dispense either one or two balls with the press of a button. It must be purchased for either 5 mm or 7 mm glass balls, and adapting the device between the two ball diameters is not possible. Use of the device for other sizes of particles is also not possible. The dispenser can only be cleaned with gentle wash liquids and water, and contains multiple moving parts that cannot be autoclaved or easily disassembled. Such limitations are common among dispensers of glass balls.

There are a few powder dispensers for laboratory materials. For defined quantities, scoops of known volume can also be used, similar to measuring cups used in cooking, but creating a mess during scoop filling as well as during scoop dumping is a concern. One existing laboratory dispenser for powders is a "48 Tube Powder Dispenser for Auto-decapping vials" (Labtie). This product works by first uncapping, either manually or using a specialized robot, all 48 tubes to be filled, with no flexibility to change the number of tubes. The caps must be kept clean and organized while separated from their tubes. The device is placed over the 48 tubes and the measuring wells of the device are filled with an excess of powder. The excess powder is brushed or scraped flush to the top of the measuring wells into a spillover bucket. The slide is pushed, opening the bottoms of the measuring wells and allowing the measured powder to fall by gravity into the tubes. Cleaning the device between powders is important and requires some disassembly. Further, there are moving parts which could trap contamination or become stuck with grit.

Another laboratory device for powders, the "Fill and Flip Microplate Bead Loader" (BioSpec) works by similarly filling multiple wells and scraping the powder flush to the top of the wells, but instead of opening the bottom of the wells, the sample vessels are manually placed inverted directly on top of the wells and the entire device is turned upside down, allowing the substance to fall into the vessels. Use of this device requires several user interventions that expose the dispensed substance to potential contamination, which include scraping the excess and placing the empty inverted vessels on top. Any excess powder may be contaminated and depending on the application, may not be suitable to recycle by putting it back into the storage container, creating waste. These existing laboratory powder dispensers are designed for many tubes or wells, limiting their flexibility.

There are also limited home options for consumable powders, with measuring cups the most common. One area where there is higher demand for dispensers is that concerned with infant milk formulas, for which repeated and hygienic dispensal is important to make safe formula with the correct consistency. A recent product, for example, is "Powdy", a milk/food powder dispenser that also serves as a powder storage container. The powder is stored in a cylindrical chamber above the attached dispensing device. By holding the storage container steady with one hand and twisting the dispensing device with the other hand along the axis of the cylinder, the configuration of internal measuring wells changes, allowing the measured quantity of powder to fall through a release hole by gravity. Like other devices with moving parts, cleaning requires disassembly, and the joints allowing movement may risk some gas exchange during storage, exposing the contents to water vapor.

The dispensing of liquids is an entirely different problem compared to the dispensing of dry powders, with a different range of possible solutions. One of them is a roughly "T"-shaped device used for dispensing liquors, with the bottom of the stem of the "T" attached to the bottle. The entire bottle can be tilted one way to fill the reservoir, tilted another way to dispense the measured liquid, and can be sealed when not in use. However, there are features in the design of this device that make it unsuitable for most dry substances. First, the stem of the "T" is curved, giving the device a chirality and thereby a "handedness", making its use less comfortable to some users. Second, the spherical shape of the measuring reservoir is problematic for dry substances, leading to difficulties in filling completely, congestion and plugging of the exit during dispensal. Third, the cork-type seals do not seal as well when dry materials get stuck between the cork and the device.

It was an object of the present invention to provide a device for dispensing a measured amount of a particulate material that overcomes the disadvantages of prior art devices at least partially.

SUMMARY OF THE INVENTION

A first aspect of the invention relates to a device for dispensing a measured amount of a particulate material having a body (10) comprising a shaft (12) and a crossbar (14) connected by a three-way junction (16) wherein the body (10) is at least partially optically transparent, wherein the shaft (12) comprises a supply aperture (18), a supply funnel (20), and attachment means (22) for reversibly connecting the body (10) with an external device, particularly a storage container for solid particulate material or a closure means, wherein the supply funnel (20) extends between the supply aperture (18) and the three-way junction (16) and is adapted for directing a flow of particulate material between the supply aperture (18) and the three-way junction (16), wherein the crossbar (14) comprises a measurement portion (24) and a dispensing portion (26) extending in opposite directions from the three-way junction (16), wherein the measurement portion (26) comprises a reservoir (28) adapted for receiving a measured amount of solid particulate material, wherein the dispensing portion (26) comprises a dispensing aperture (30), a dispensing pipe (32) and attachment means (34) for reversibly connecting the body (10) with an external device, particularly a receiving container, an adapter or a closure means, and wherein the dispensing pipe (32) extends between the dispensing aperture (30) and the three-way junction (16) and is adapted for directing a flow of particulate material between the reservoir (28) and the dispensing aperture (30), and wherein the three-way junction (16) has an opening (16a) to the shaft, an opening (16b) to the measurement portion and an opening (16c) to the dispensing portion, wherein the opening (16a) of the shaft and the opening (16b) of the measurement portion form a measurement edge (44), and wherein the diameter of the opening (16c) to the dispensing portion is at least as great as the diameter of the opening (16b) to the measurement portion.

A further aspect of the invention relates to a method for dispensing a measured amount of a particulate material, comprising using the above device, particularly comprising the steps:

providing a dispensing unit comprising the device attached to a storage container comprising the particulate material, tilting the unit to a position where the dispensing pipe (32) is facing upward and the reservoir (28) is filled with particulate material, tilting the unit into an opposite direction whereby excess particulate material flows back into the storage container and wherein a measured amount of the particulate material remains in the reservoir (28), optionally observing the measured amount of particulate material through an optically transparent part of body (10), and rotating the unit including the storage container by about 180° along the axis of the shaft (12) allowing the measured amount of particulate material flow from the reservoir (28) through the dispensing pipe (32) and the dispensing aperture (30).

DETAILED DESCRIPTION OF PREFERRED EMBODIMENTS

According to the present invention, an at least partially transparent dispensing device for particulate material including powders, irregularly shaped particles, and balls, is provided. The device can be attached to the opening of screw-cap containers as an alternative storage lid. The device can be hermetically sealed and involves no moving parts. The dispensing action involves tilting the container to fill a transparent measurement reservoir of adaptable volume. The accurately measured substance can be dispensed by rotating the entire container by about 180 degrees so that the measurement reservoir is upside-down, allowing the contents to flow by gravity from the reservoir out of a release pipe into a new vessel.

The device has several major advantages that distinguish it from competing devices, which follow from its key features. It allows intuitive and accurate dispensal of dry substances from fine powders to irregularly shaped particles to beads and balls, whereas many devices are limited to balls because of the sensitivity of moving parts to fine particles. The device also accomplishes the measurement step without the substance exposed to large amounts of air, and in fact can be completed with the dispensing pipe still fully sealed if necessary, preventing air currents from creating puffs of fine powders. The transparent construction allows visual inspection of the measured amount prior to dispensal, and because the amount can be easily adjusted within the device and without intervention by external tools, the excess substance can flow back into the storage container without contamination. The symmetric construction allows release drop to occur by rotating the device either clockwise or counterclockwise, making it equally comfortable for left and right handed uses.

Unlike many other dispensers, which can only dispense defined units, the device of the invention can also be used without filling the measurement reservoir, freely pouring the stored substance directly into another vessel through the dispensing aperture. The construction with the measuring reservoir enclosed in a robust unit with no moving parts enables it to be hermetically sealed, e.g. with screw-on lids. Thus, the device can serve as an alternative lid for long-term storage of the substance to be dispensed. The reservoir can be adapted to different geometries and volumes to measure different types of substances, or different quantities of substances, using volume adjusting means, e.g. screw-on attachments that integrate into the same unit. The simplicity of the design makes production inexpensive, and makes cleaning easy.

The device of the present invention comprises a body that is at least partially optically transparent. In certain embodiments, the body consists of an optically transparent material. The body may be formed from any suitable material, particularly a plastic material such as polyethylene, polypropylene, a polyterephthalate-based material such as polyethylene-terephthalate, a polyacryl-based material such as polymethylmethacrylate, polycarbonate, a polystyrene-based material, or polylactide, or a glass material such as a borosilicate glass. In certain embodiments, the body is formed from a material, which is capable of withstanding cleaning with a variety of methods such as treatment with organic solvent, bleaching, heat and/or pressure treatment including autoclaving at a temperature of 100° C. or more. Thus, in certain embodiments, the device is sterile or sterilized.

In certain embodiments, the body has no moving parts when operated during a dispensing procedure. In certain embodiments, the device comprises an integrally manufactured body. Manufacturing may be carried out by known procedures, e.g. injection molding or 3D printing.

The body of the device comprises a shaft and a crossbar connected by a three-way junction. Typically, the body has a "T"-shape. In certain embodiments, the body is symmetrical, i.e. symmetrical with regard to a mirror plane extending through the shaft and the crossbar. The shaft is adapted for providing a connection to a storage container for the particulate material, which is to be dispensed. The crossbar comprises a measurement portion comprising a reservoir adapted for receiving a measured amount of particulate material and a dispensing portion for dispensing the measured amount of particulate material from the device.

The shaft comprises a supply aperture for receiving particulate material from a storage container and attachment means for reversibly connecting the body with an external device, particularly with a storage container for solid particulate material or a closure means, e.g. a screw cap. In certain embodiments, the attachment means is adapted for providing a tight, e.g. gastight reversible connection to the storage container or the closure means. Preferably, the attachment means is adapted for providing a thread connection to the external device. In such a case, the supply base may comprise a thread, e.g. on its inner side, adapted to mate with a fitting thread on the storage container or the closure means.

The shaft further comprises a supply funnel extending between the supply aperture and the three-way junction. The supply funnel is adapted for directing a flow of particulate material between the supply aperture and the three-way junction. In certain embodiments, the supply funnel extends straight from the supply aperture to the three-way junction, i.e. without being substantially curved. The geometry and length of the supply funnel may vary dependent on several factors including the type of particulate material, the diameter of the opening of the storage container, and/or the diameter of the shaft at the three-way junction. In certain embodiments, the supply funnel is tapered from the supply aperture towards the three-way junction. In some embodiments, particularly when the supply aperture is narrow, the supply funnel may have little or no taper. In certain embodiments, the supply funnel may have recesses and/or protrusions, particularly in the portion nearer to the three-way junction, including ridges, edges, and/or narrowings that prevent unintended dispensal from the supply aperture when flipped.

The crossbar of the device comprises a measurement portion and a dispensing portion extending in roughly opposite directions from the three-way junction. In certain embodiments, the measurement portion and a dispensing portion form an angle of greater than 90°, particularly greater than 120°, e.g. about 135° to about 180° measured from the middle of the three-way junction.

The measurement portion of the crossbar comprises a reservoir adapted for receiving a measured amount of solid particulate material. In certain embodiments, the reservoir has a substantially cylindrical shape. Preferably, the inner diameter of the reservoir is substantially constant from the three-way junction to the bottom of the reservoir (i.e. the portion most distal from the three-way junction). In certain embodiments, the bottom of the reservoir is straight. In certain further embodiments, the bottom of the reservoir is rounded or U-shaped thus preventing particles, e.g. fine powder particles from sticking in corners.

In certain embodiments, the reservoir has an invariable volume, i.e. a volume that is predetermined by the body shape. In further embodiments, the reservoir has a variable volume that may be provided by a volume adaptation means, particularly by a thread connection. Such a thread connection may be adapted for providing a connection of a screw cap having a thread fitting to the thread on the reservoir. This allows connection with different screw caps, i.e. screw caps having different shapes for providing different reservoir volumes. The volume of the reservoir may be selected in broad ranges depending on the size of the device and the size and amount of particulate material to be measured. Typically, the volume is between about 0.005 ml to about 10 l, preferably from about 0.01 ml to about 1 l and more preferably from about 0.02 ml to about 0.5 l.

The dispensing portion of the crossbar comprises a dispensing aperture for dispensing the measured amount of particulate material from the device. Further, the dispensing portion comprises an attachment means for providing a tight, e.g. gastight reversible connection of the body to an external device, particularly a receiving container, an adapter, e.g. a dispensing funnel, or a closure means, e.g. a screw cap. A dispensing pipe extends between the dispensing aperture and the three-way junction and is adapted for directing a flow of particulate material between the reservoir and the dispensing aperture. In certain embodiments, the inner diameter of the dispensing pipe is tapered from the three-way junction towards the dispensing aperture. Preferably, the attachment means is adapted for providing a thread connection to the external device. In such a case, the dispensing portion may comprise a thread, e.g. on its inner side, adapted to mate with a fitting thread on the receiving container, the adapter or the closure means.

The body of the device comprises a three-way junction connection linking the shaft and both portions of the crossbar. Thus, three-way junction has an opening to the shaft, an opening to the measurement portion of the crossbar and an opening to the dispensing portion of the crossbar.

According to the present invention, the opening to the shaft and the opening to the measurement portion form a measurement edge, which allows exact measuring of even fine particles. Preferably, the angle between the shaft and the reservoir is from about 45° to about 90°. In certain embodiments, the measurement edge is an edge having a substantially right angle. In certain embodiments, the measurement edge is acute. The edge may also be slightly rounded or beveled. Some rounding or beveling may occur naturally due to constraints in the material or manufacturing that limit the sharpness. In embodiments in which additional rounding is added to the measurement edge, the rounding should preferably not remove edge material extending inward from the edge to more than half of the diameter of the particle being dispensed.

Further, it is preferred that the wall of the measurement portion, e.g. a substantially cylindrical wall, including that which is on the side connected to the measurement edge, is straight over much of its length in the direction along the axis of the measurement cylinder, preferably at least 50% of its length, allowing for rounding at the bottom of the cylinder and/or some rounding of the measurement edge.

Further, according to the invention, the diameter of the opening to the dispensing portion is at least equal to the diameter of the opening to the measurement portion. Preferably, the diameter of the opening to the dispensing portion is greater, e.g. at least 1.5 times greater or even two or more times greater than the diameter of the opening to the measurement portion. The term "diameter" in this context refers to the longest axis of the opening in case the opening is not circular. Thus, in embodiments in which the opening to the dispensing portion is oblong or elliptical, the longest axis of the opening of the dispensing portion is preferably at least as great as the diameter of the opening of the measurement portion, e.g. at least 1.5 times greater or even two or more times greater.

In certain embodiments, the device may comprise a valve adapted for adjusting a suitable gas atmosphere, e.g. a protective gas atmosphere within the interior of the device.

The device of the present invention may be used for dispensing of any type of particulate material, i.e. solid matter, particularly dry solid matter in the form of particles. The average particle diameter of the material may vary in broad ranges, e.g. between about 1 nm to about 10 cm, preferably from about 10 nm to about 1 cm and more preferably from about 100 nm to about 0.5 cm. The device may be adapted for dispensing a single particle or for dispensing a plurality of particles, e.g. depending on the reservoir volume and particle size.

The particles may be regularly shaped, e.g. as balls or beads, but also irregularly shaped materials may be dispensed. The material may be selected from any type of solid particulate material, e.g. from metal, metal oxide, salts, glass, plastic particles, rocks and stones, from particles of chemicals, biologic materials and biomolecules, e.g. foodstuff, sugar, agarose etc., including mixtures or particulate composites of several such materials.

The device may be adapted for manual operation wherein the procedure of dispensing a measured amount of particulate material is performed by a human operator. Alternatively, the device may be adapted for automated operation wherein the procedure of dispensing a measured amount of particulate material is performed by a machine.

The device may be used in any possible field including household, industry including food industry, pharmacology, medicine and research.

DESCRIPTION OF FIGURES

Figures 2A, 2B:
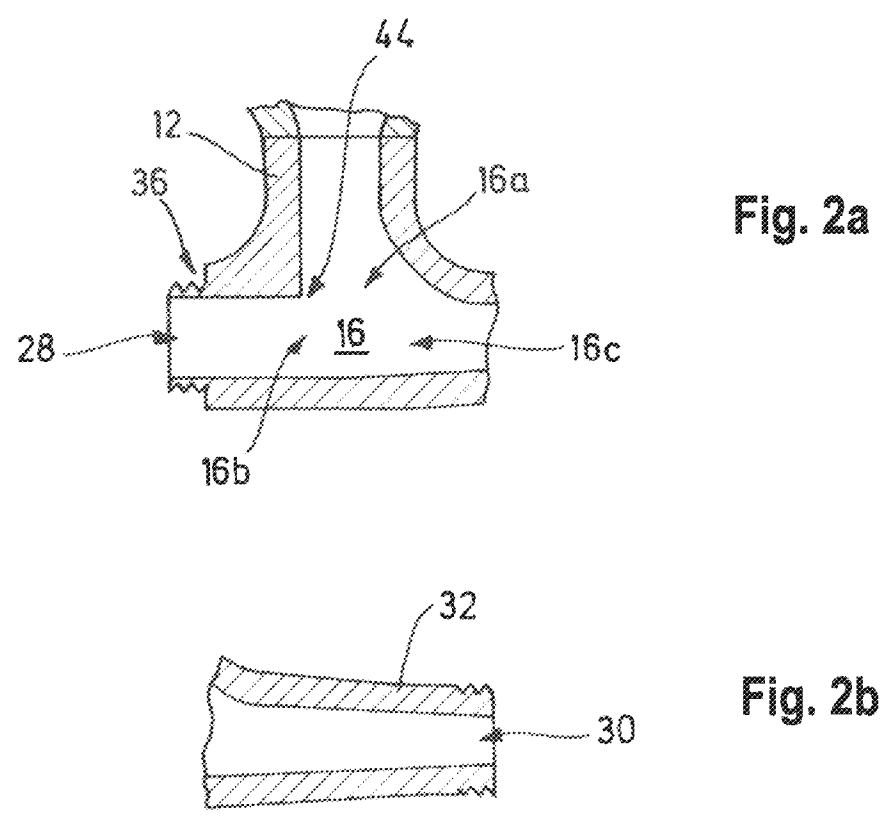

FIGS. 2a and 2b show a schematic depiction of a further embodiment of the present invention.

As shown in FIG. 1a, the device of the invention comprises a body (10) which is roughly "T"-shaped. The body comprises a shaft (12) and a crossbar (14) connected by a three-way junction (16). The base of the shaft (12) comprises a thread (22) which may be attached to the opening of a screw-cap storage container (not shown) as an alternative storage lid. The threaded connection allows an airtight attachment of the dispenser with a screw-cap storage container, replacing a normal storage lid. The device does not contain moving parts and can be hermetically sealed using screw-on caps to prevent contamination of the contents from liquids such when immersed, or from gases such as water vapor during long-term storage.

FIG. 1b shows an enlarged section (A) of the shaft (12) including a supply aperture (18) and the thread (22). FIG. 1c is a front view of the device from FIG. 1a showing shaft (12) and supply aperture (18). In FIG. 1d a sectional drawing (B-B) of the device from FIG. 1c is shown. The crossbar comprises a measurement portion (24) including a reservoir (28) and a dispensing portion (26) including a dispensing aperture (30), a dispensing pipe (32) and attachment means (34). The three-way junction (16) has an opening (16a) to the shaft, an opening (16b) to the measurement portion and an opening (16c) to the dispensing portion. Between the openings (16a) and (16b) a cliff-like measurement edge (44) is provided. The diameter of the dispensing pipe (32) at the opening (16c) is wider than the diameter of the opening (16b) of the measurement reservoir (28). This allows any laterally-moving measured particles falling from the reservoir to be redirected into the dispensing pipe.

FIG. 2a is an enlarged sectional view of the three-way junction (16) and its openings (16a, 16b, 16c). A cliff-like measurement edge (44) is provided where the opening (16a) of the shaft (12) meets the opening (16b) of the reservoir (28) to trap all measured substance in the reservoir during the filling step. The reservoir (28) on the measurement portion of the crossbar of the "T" may have any shape, e.g. a cylinder. The top of the reservoir is defined by the opening of the shaft (16a) and the bottom of the reservoir is defined by a closed end, which may also be an attachment means (36), e.g. a tightly-sealing screw cap adapter (that can be exchanged). FIG. 2b shows a sectional view of the cylindrical dispensing pipe (32) that directs the measured amount of material through the dispensing aperture (30) into a collection vessel (not shown). Dispensing pipe (32) comprises an attachment means (34), e.g. a threaded end that can be connected to an external device including the collection vessel, an adapter such as an aperture funnel to further adjust the aperture size or a hermetically sealable screw cap on the dispensing pipe for long-term storage.

FIG. 3 is a side view of the device from FIG. 1a showing the shaft (12), the measurement portion (24) including the reservoir (28) and attachment means (36), e.g. a thread, and the dispensing portion (26) including the dispensing pipe (32) and attachment means (34), e.g. a thread. Attachment means (36) on the reservoir (28) may be connected with different volume adapters (40, 42), e.g. screw caps providing different volumes for the measurement reservoir (28). Attachment means (34) on the dispensing pipe (32) may be connected with any suitable external device (38), e.g. a closure cap.

In FIG. 4 a typical dispensing procedure is shown. (A) The device is in the storage position on top of a storage container (not shown). (B) The entire unit is tilted with the dispense pipe facing upward to fill the measurement reservoir. (C) The entire unit is tilted the opposite direction to send excess dry substance back into the storage container. (D) The correctly measured amount can be observed through transparent walls. (E) A 180° rotation of the entire unit, including the storage container, either clockwise or counterclockwise according to the preferences of the user along the axis of the shaft inverts the device, allows the substance to fall through the dispensing pipe into a new vessel (not shown). The ambidextrous use, allowing rotation in either direction, provides equally efficient dispensing.

Figures 1A, 1B, 1C, 1D:
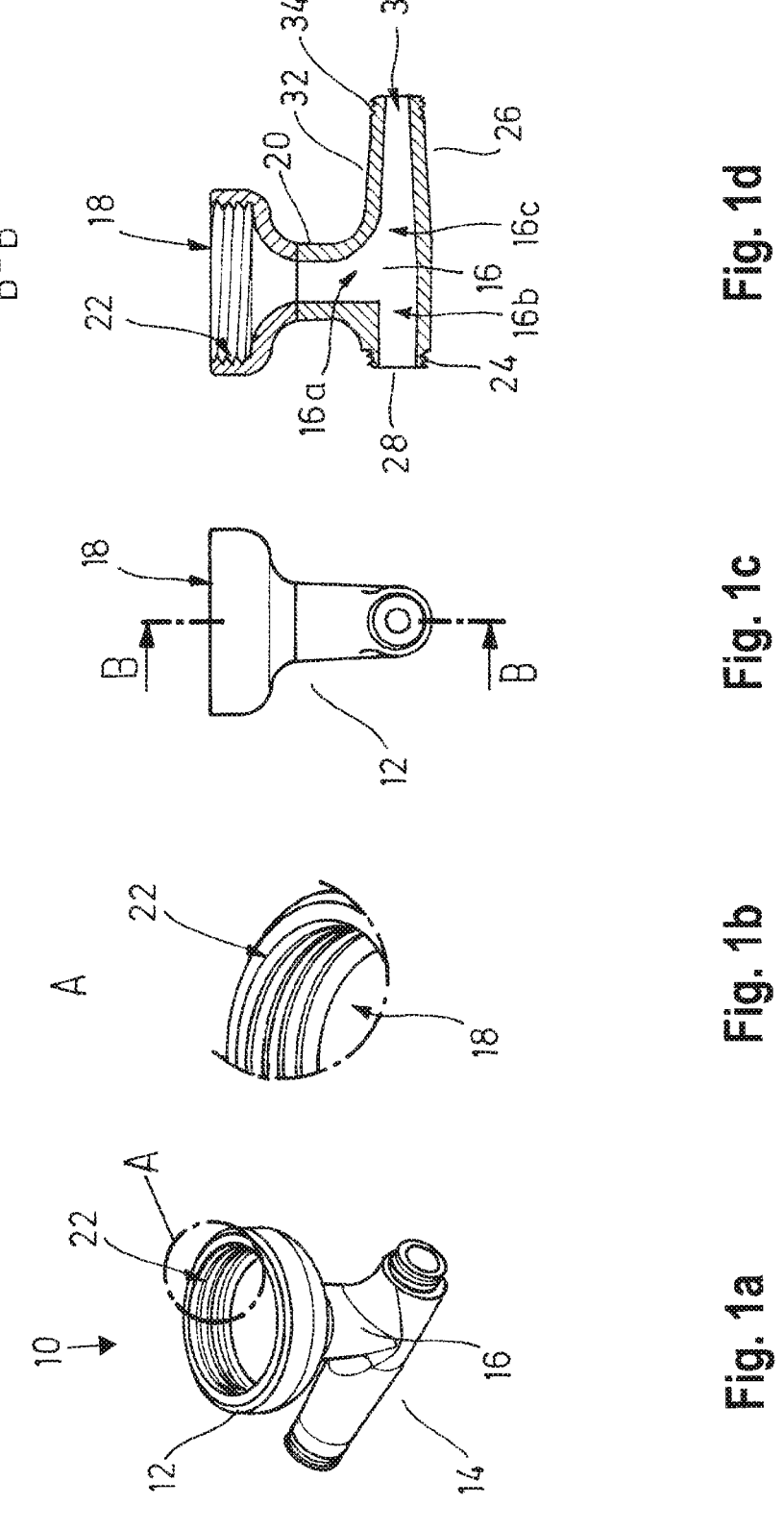
FIGS. 1a-1d show a schematic depiction of an embodiment of the present invention.
Figure 3:
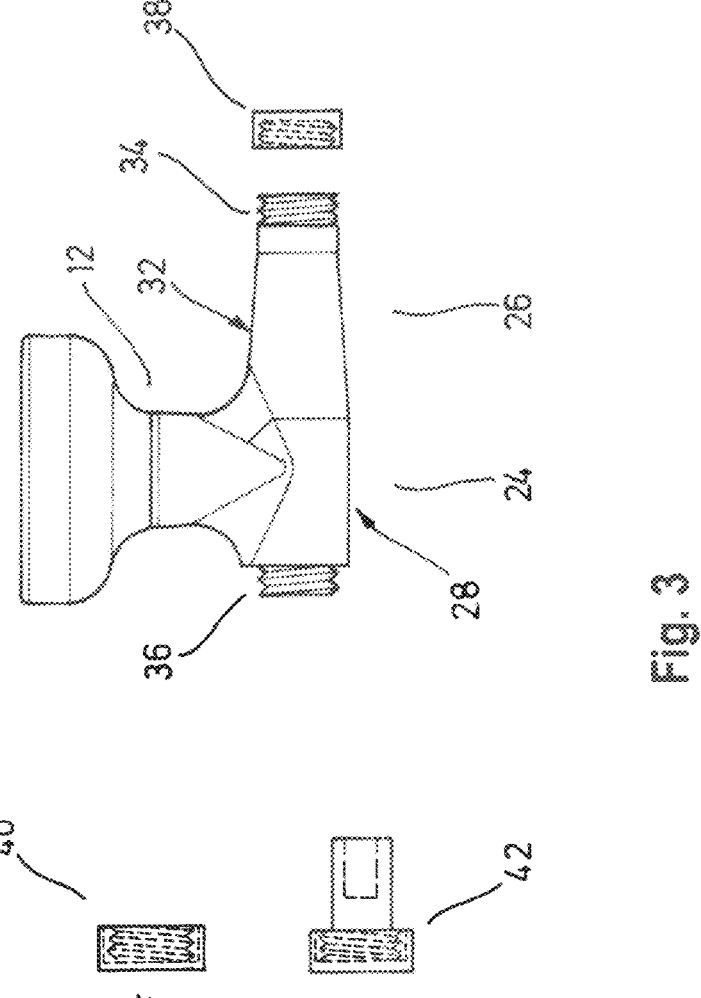
FIG. 3 shows a schematic depiction of a further embodiment of the present invention including a screw cap adapter for adjusting different reservoir volumes.
Figure 4:
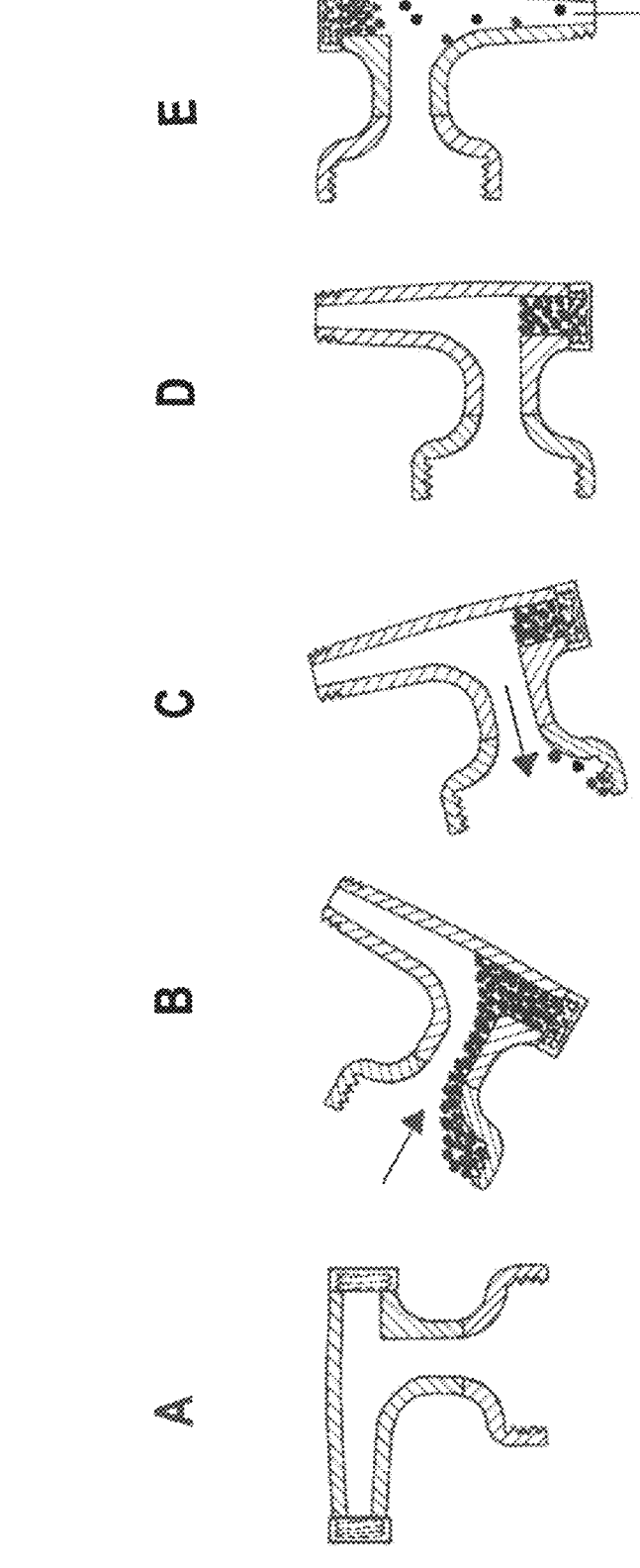
FIG. 4 shows a schematic depiction of a dispensing procedure using the device of the present invention.

The invention claimed is:

1. A device for dispensing a measured amount of a particulate material having a body comprising a shaft and a crossbar connected by a three-way junction wherein the body is at least partially optically transparent, wherein the shaft comprises a supply aperture, a supply funnel, and attachment means for reversibly connecting the body with an external device, wherein the supply funnel extends between the supply aperture and the three-way junction and is adapted for directing a flow of particulate material between the supply aperture and the three-way junction, wherein the crossbar comprises a measurement portion and a dispensing portion extending in opposite directions from the three-way junction, wherein the measurement portion comprises a reservoir adapted for receiving a measured amount of solid particulate material, wherein the dispensing portion comprises a dispensing aperture, a dispensing pipe and attachment means for reversibly connecting the body with an external device, and wherein the dispensing pipe extends between the dispensing aperture and the three-way junction and is adapted for directing a flow of particulate material between the reservoir and the dispensing aperture, and wherein the three-way junction has an opening to the shaft, an opening to the measurement portion and an opening to the dispensing portion, wherein the opening of the shaft and the opening of the measurement portion form a measurement edge, and wherein the diameter of the opening to the dispensing portion is at least as great as the diameter of the opening to the measurement portion.

2. The device of claim 1, wherein the attachment means on the shaft is adapted for providing a gastight connection to the storage container.

3. The device of claim 1, wherein the attachment means on the shaft is adapted for providing a thread connection to the storage container.

4. The device of claim 1, wherein the supply funnel extends straight from the supply aperture to the three-way junction.

5. The device of claim 1, wherein the supply funnel is tapered from the supply aperture towards the three-way junction.

6. The device of claim 1, wherein the reservoir has a substantially cylindrical shape.

7. The device of claim 1, wherein the reservoir has an invariable volume.

8. The device of claim 1, wherein the reservoir has a variable volume.

9. The device of claim 8, wherein the variable volume of the reservoir is provided with a volume adaptation means.

10. The device of claim 9, wherein the thread connection means is adapted for providing a connection to different volume adapters.

11. The device of claim 1, wherein the volume of the reservoir is between about 0.005 ml to about 10 ml.

12. The device of claim 1, wherein the attachment means on the dispensing pipe comprises a thread connection means.

13. The device of claim 1, wherein the attachment means on the dispensing pipe is adapted for providing a gastight connection with an external device.

14. The device of claim 1, wherein the measurement edge has an angle of about 45° to about 90°.

15. The device of claim 1, wherein the measurement edge is acute or substantially acute including slightly rounded or beveled.

16. The device of claim 1, which further comprises a gas valve.

17. The device of claim 1 having a body without moving parts.

18. The device of claim 1 having an integrally manufactured body.

19. The device of claim 1 wherein body is manufactured by injection molding or 3D printing.

20. The device of claim 1 wherein body consists of an optically transparent material.

21. The device of claim 1, which is sterile or sterilized.

22. The device of claim 1, which is adapted for the delivery of a particulate material having an average particle diameter between about 1 nm to about 10 cm.

23. The device of claim 1, which is adapted for the delivery of a particulate material selected from metal, metal oxide, salts, glass, plastic particles, rocks and stones, particles of chemicals, biologic materials and biomolecules, including mixtures or composites of several such materials.

24. The device of claim 1, which is adapted for manual operation.

25. The device of claim 1, which is adapted for automated operation.

26. The device of claim 1, which is adapted for use in household, industry including food industry, pharmacology, medicine and research.

27. A method for dispensing a measured amount of a particulate material comprising using a device of claim 1.

28. The method of claim 27, comprising the steps:

providing a dispensing unit comprising the device attached to a storage container comprising the particulate material, tilting the unit to a position where dispensing pipe is facing upward and reservoir is filled with particulate material, tilting the unit into an opposite direction whereby excess particulate material flows back into the storage container and wherein a measured amount of the particulate material remains in reservoir, optionally observing the measured amount of particulate material through an optically transparent part of body, and rotating the unit including the storage container by about 180° along the axis of shaft allowing the measured amount of particulate material flow from reservoir through dispensing pipe and dispensing aperture.

29. The method of claim 27, wherein the particulate material is dispensed into a receiving container.

\* \* \* \* \*